Nov. 13, 1951  G. D. BERDAN  2,574,725
LAWN MOWER HAVING A SLIDABLE AND TILTABLE REEL
Filed July 12, 1948
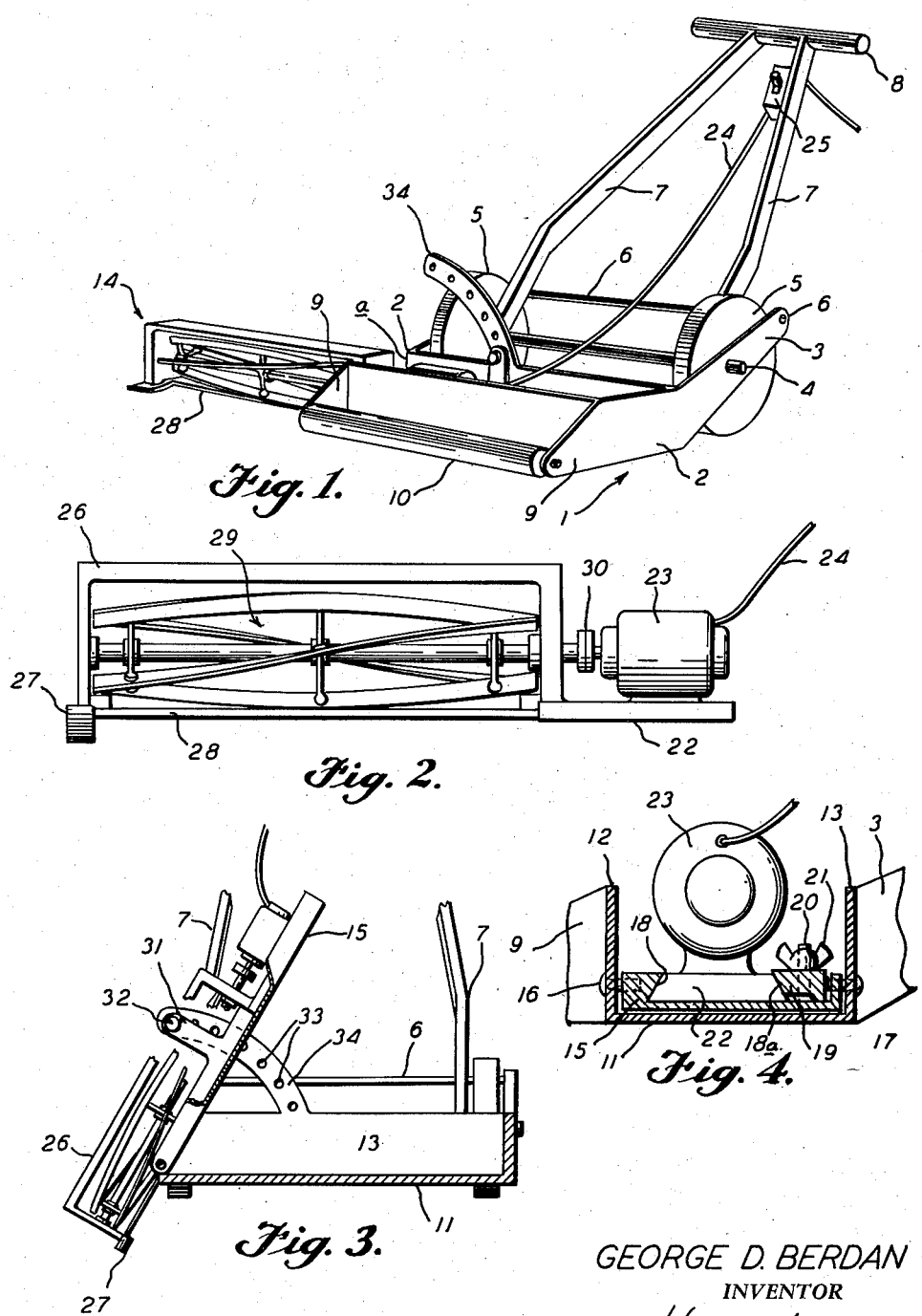
GEORGE D. BERDAN
INVENTOR

Patented Nov. 13, 1951

2,574,725

UNITED STATES PATENT OFFICE 2,574,725

LAWN MOWER HAVING A SLIDABLE AND TILTABLE REEL

George D. Berdan, Fort Worth, Tex.

Application July 12, 1948, Serial No. 38,216

2 Claims. (Cl. 56—26)

This invention relates to lawn mowers and has reference to a mower having a power driven reel type unit for cutting and trimming grass.

An object of the invention is to provide a reel type mower capable of trimming lawn edges as well as mowing horizontal surfaces.

Another object of the invention is to provide an extensible reel type mower which may be partially retracted into the supporting frame and tilted so as to conveniently trim the edges of a lawn, such as around the border of a flower bed.

Another object of the invention is to provide a motor and cutter unit which is relatively simple in construction for carrying out the foregoing objects.

These and other objects of the invention will become apparent from the following description of the accompanying drawings, wherein:

Figure 1 is a perspective view of a lawn mower embodying the features of the present invention.

Figure 2 is a front elevational view of the reel type mower unit apart from the frame illustrated in Figure 1.

Figure 3 is a front broken elevational and sectional view of the mower illustrated in Figure 1 and showing the mower unit in a tilted position for trimming the edge of a lawn.

Figure 4 is a transverse sectional view of the center portion of the frame and showing a gib arrangement for slidably extending and retracting the mower unit.

The form of the invention shown includes a rectangular frame 1 having vertical side members 2 and rearwardly and upwardly projections 3 along each side of the said frame. An axle 4 is journaled through the projections 3 and has a pair of spaced wheels 5 mounted thereon. A tie rod 6 is connected between the extending ends of the projections 3 for supporting a pair of handle bars 7 which are journaled, at their lower ends, on the axle 4. A handle 8 is mounted at the upper ends of the handle bars 7. The frame 1 includes forward projections 9 at each side of the frame 1 and has a roller 10 mounted between the same. The frame 1 also includes a base plate 11 between the side members 2 and along the lower edges of the latter. Transverse partitions 12 and 13 are integral with the side members 2 and perpendicular to the base plate 11, as shown in Figures 3 and 4. One of the side members 2 is cut away, as at a, Figure 1, to accommodate a reel type mower unit 14 which is slidably and tiltably extensible through the opening a in the frame member 2. The last referred to arrangement is carried out by means of a supporting plate 15 which is pivotally secured between the forward and rearward partitions 12 and 13, respectively, by means of pins 16 and 17 positioned through the said partitions near the lower edges thereof and near the side opening a.

As shown in Figure 4, the plate is provided with an inwardly directed dove-tail groove 18 along one side thereof and a corresponding and opposing angular edge 18a along a clamp member 19. The clamp 19 is retained by means of an upstanding bolt 20 secured to the plate 15 and extending upwardly through the said clamp. A wing nut 21 on the bolt 20 secures the clamp 19 against the longitudinal beveled edges of a motor base 22, said base supporting an electric motor 23 on its upper surface. Power is supplied to the motor 23 by means of an extension cord 24, and which cord may be provided with a switch 25 mounted on one of the handle bars 7.

An inverted U-shaped bracket 26 is secured to the motor base 22 at one end thereof and extends outwardly where it has an arcuate foot 27 at its outer lower end. A knife bar 28 is secured between the lower ends of the bracket 26 for coaction with a reel type cutter 29 journaled in the ends of the said bracket and connected with the motor 23 by means of a coupling 30.

An upstanding bracket 31 is positioned along the rearward side of the tiltable plate 13 and has a removable bolt 32 in its upper end for registering with holes 33 in an arcuate brace 34 integral with the rearward transverse partition 13 and formed in an arc about the axial center of the pivot pins 16 and 17.

In operation, the mower unit 14 is extended through the side opening a for mowing lawns and similar operations. When trimming the lawn edges, the mower unit 14 is partially retracted and secured in a tilted position, as shown in Figure 3. It is to be understood that the referred to sliding movement and positioning of the mower unit 14 is carried out by operation of the wing nut 21 and the manual sliding of the said unit, and that the tilted position of the unit is carried out by means of the removable bolt 32 in the upstanding bracket 31.

The described form of the invention is not restricted, but may be made in many ways within the scope of the appended claims.

What is claimed is:

1. In a lawn mower, a frame supported on wheels, a support pivotally secured to the said frame at one side thereof, a power driven reel type mower unit slidably secured on said support for movement along the axis of said mower unit, said unit including a motor mounted on said support, an inverted U-shaped bracket secured to the said motor base, a reel type cutter journaled in the legs of the said bracket and coupled with the said motor, and a knife bar between the legs of the said U-shaped bracket for coaction with the said cutter.

2. In a lawn mower, a frame supported on wheels, a power driven reel type mower unit slidably mounted for movement along the axis thereof and tiltably attached adjacent one side of said frame, said unit including a motor base, a motor mounted on said base, a U-shaped bracket secured to the said motor base, a reel type cutter journaled in the legs of said bracket and coupled with said motor, and a knife bar between the legs of the said U-shaped bracket positioned and arranged for coaction with said cutter.

GEORGE D. BERDAN.

REFERENCES CITED

The following references are of record in the file of this patent:

UNITED STATES PATENTS

| Number | Name | Date |
| --- | --- | --- |
| 1,823,267 | Gilardi | Sept. 15, 1931 |
| 2,097,761 | Gallinant | Nov. 2, 1937 |
| 2,161,357 | Kaplan | June 6, 1939 |
| 2,309,635 | Edwards | Feb. 2, 1943 |